C. STRONG.

Coffin-Handles.

No. 5,374. Reissued April 22, 1873.

Attest;
Jno P. Brooks
Frank Blackburn

Inventor;
C. Strong

AM. PHOTO-LITHOGRAPHIC CO. N.Y. (OSBORNE'S PROCESS.)

UNITED STATES PATENT OFFICE.

CLARK STRONG, OF WINSTED, CONNECTICUT.

IMPROVEMENT IN COFFIN-HANDLES.

Specification forming part of Letters Patent No. 97,827, dated December 14, 1869; reissue No. 5,374, dated April 22, 1873; application filed April 10, 1873.

*To all whom it may concern:*

Be it known that I, CLARK STRONG, of Winsted, Connecticut, have invented a new and useful Improvement in Coffin-Handles, of which the following is a specification:

This invention relates to a new and useful improvement in coffin-handles; and it consists, first, in double sockets of peculiar form and construction; second, in the manner of forming and securing the pivots in the arms; and, third, in the manner of securing the tubular handle to the pivoted arms, all as will be hereinafter set forth.

Figure 1:
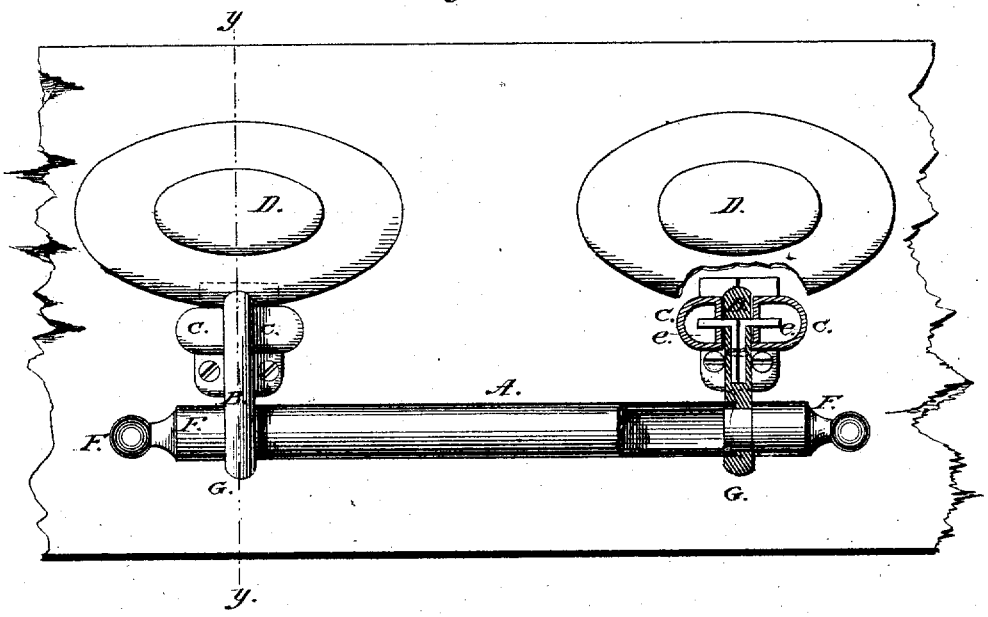
Figure 2:
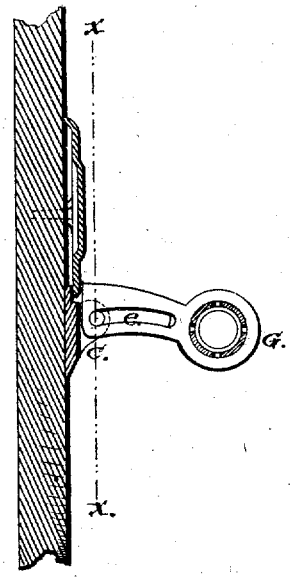

In the accompanying sheet of drawing, Figure 1 represents the handle, partly in section, applied to the side of a coffin, the section being through the line *x x* of Fig. 2. Fig. 2 is a vertical section through the line *y y* of Fig. 1.

Similar letters of reference indicate corresponding parts.

A is the handle proper, secured to the arms B B, as will be described hereafter. C C are the sockets, by which the arms are hinged to the coffin. D D represent ornamental plates, of any desired shape or device, by which the upper ends of the sockets *c c* are secured, as seen in the drawing. Tenons are formed on the upper ends of the sockets, which pass into recesses in the plates. The lower ends of the sockets are secured by screws. *e e* are the pivot-pieces, which project from the arms and enter the sockets, forming the hinge by which the handle is allowed to rise until the ends of the arms strike the plates D. The handle is shown in the raised position in Fig. 2. The pivots *e* are formed of right-angle pieces of wire, placed in the mold and cast in the arms, as seen in the sectional portion of the drawing, Fig. 1. These wires (or the portions which are inclosed by the metal) are flattened, and the inner flattened sides are placed together, as seen in the drawing, so that the arms will be strengthened thereby.

As coffin-handles have heretofore generally been made, but one socket and pivot have been employed for each end of the handle. By employing two sockets, in the manner shown in the drawing, and thereby doubling the strength of the hinge, the unfortunate accidents which sometimes occur at funerals are prevented.

Casting in the arms the flattened shanks of the pivots *e* prevents the arms from breaking, and thereby another safeguard is provided. It will be seen that the strain upon a single pivot would be very great, and that the cast arms B unprotected by wrought-iron or steel, are liable to break. My object is to increase the strength and render a failure of the parts simply impossible.

Every precaution should be taken to prevent the distressing scenes which sometimes occur at funerals by the breaking or failure of the coffin-handles.

The outer ends of the arms B form a ring which receives the ends of the tubular handles A. F represents the tips, which enter the ends of the handle (within the rings G) of the arms. The ends of the handle are slotted, as seen in the drawing, so that they may the more readily be expanded after being placed in the ring. When these ends have been thus expanded, the tips F are forced into them, making the connection permanent, and forming a handsome finish to the handle. A cross-section of the parts within the ring of the arm is seen in Fig. 2.

I am not aware that any tubular handle has ever before been securely fastened to the connecting parts by means of the outer pressure of the ring of the lever or arm, this ring being forced upon the end of the tube, and the plug or tip being forced into the end of the tube.

It will thus be seen that the essential feature of my invention consists in dispensing with fastenings of any sort by taking advantage of the expansive force of the elastic metal and the wedge-like pressure of the tip or plug, the three pieces—viz., the tube, the lever, and the tip, being forced together in the order and manner described, so as to fasten themselves securely together.

The advantages of this method of constructing coffin-handles are, that while the expense is not materially increased, a handsome and ornamental handle is produced, and perfect safety from accident is insured.

Having thus described my invention, I claim as new and desire to secure by Letters Patent—

1. The use of double sockets C C, in combination with the arm of the coffin-handle, substantially as shown and described.

2. Providing the arms B with pivots *e e*, formed of pieces of wire, and having a right-angled flattened shank placed together, so that when the arm is cast upon them, there will be an equal thickness of metal on both sides thereof, substantially as described.

3. Securing the handle A to the arms B B by means of the tips F driven into the ends of the handle, substantially as set forth.

The above specification of my invention signed by me this 21st day of March, 1873.

CLARK STRONG.

Witnesses:

MARK L. WHEELER,

WILLIE C. MCCORMICK.